(12) United States Patent
Boss et al.

(10) Patent No.: US 8,584,135 B2
(45) Date of Patent: *Nov. 12, 2013

(54) INTELLIGENT BUYER'S AGENT USAGE FOR ALLOCATION OF SERVICE LEVEL CHARACTERISTICS

(75) Inventors: Gregory J. Boss, American Fork, UT (US); Christopher J. Dawson, Arlington, VA (US); Rick A. Hamilton, II, Charlottesville, VA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/571,904

(22) Filed: Aug. 10, 2012

(65) Prior Publication Data

US 2012/0303400 A1     Nov. 29, 2012

Related U.S. Application Data

(63) Continuation of application No. 11/755,980, filed on May 31, 2007, now Pat. No. 8,332,859.

(51) Int. Cl.
*G06F 9/46* (2006.01)
*G06F 15/16* (2006.01)

(52) U.S. Cl.
USPC .......................................... 718/104; 709/202

(58) Field of Classification Search
USPC ........................................... 718/104; 709/202
See application file for complete search history.

(56) References Cited

U.S. PATENT DOCUMENTS

| | | | |
|---|---|---|---|
| 5,371,780 A | 12/1994 | Amitay |
| 6,006,194 A | 12/1999 | Merel |
| 6,236,981 B1 | 5/2001 | Hill |
| 6,438,539 B1 | 8/2002 | Korolev et al. |
| 6,550,881 B1 | 4/2003 | Phillips |
| 6,553,568 B1 | 4/2003 | Fijolek et al. |
| 6,678,700 B1 | 1/2004 | Moore et al. |
| 6,732,140 B1 | 5/2004 | McCue |
| 6,754,739 B1 | 6/2004 | Kessler et al. |
| 6,842,899 B2 | 1/2005 | Moody et al. |
| 6,859,927 B2 | 2/2005 | Moody et al. |
| 6,925,493 B1 | 8/2005 | Barkan et al. |
| 6,947,987 B2 | 9/2005 | Boland |
| 6,968,323 B1 | 11/2005 | Bansal et al. |

(Continued)

OTHER PUBLICATIONS

Lan, U.S. Appl. No. 11/755,971, Final Office Action, Nov. 21, 2012, 17 pages.

(Continued)

*Primary Examiner* — Jennifer To
*Assistant Examiner* — Brian Chew
(74) *Attorney, Agent, or Firm* — Lisa Ulrich; Hoffman Warnick LLC

(57) ABSTRACT

A system, method, program product and service for managing bidding in a resource management framework. A buyer's agent is provided to manage the bidding process for resources for a client. The buyer's agent includes the ability to submit a bid to a resource broker to acquire a set of resources for the client based on service level requirements of the client. Once the set of resources is obtained, they are monitored to ensure the required service level of the client is being met. If the service level requirements are not met, the buyer's agent automatically resubmits a bid to the resource broker. Finally, collaboration among a plurality of buyer's agents may be utilized to avoid bidding wars and the like.

10 Claims, 2 Drawing Sheets

(56) References Cited

U.S. PATENT DOCUMENTS

| | | | |
|---|---|---|---|
| 6,987,578 | B2 | 1/2006 | Alexander |
| 7,062,559 | B2 | 6/2006 | Yoshimura et al. |
| 7,099,681 | B2 | 8/2006 | O'Neill |
| 7,103,580 | B1 | 9/2006 | Batachia et al. |
| 7,103,847 | B2 | 9/2006 | Alford, Jr. et al. |
| 7,177,832 | B1 | 2/2007 | Semret et al. |
| 7,177,838 | B1 | 2/2007 | Ling |
| 7,222,345 | B2 | 5/2007 | Gray et al. |
| 7,249,099 | B2 | 7/2007 | Ling |
| 7,266,523 | B2 | 9/2007 | Depura et al. |
| 7,401,035 | B1 | 7/2008 | Young |
| 7,634,430 | B2 | 12/2009 | Huberman et al. |
| 2001/0034688 | A1 | 10/2001 | Annunziata et al. |
| 2001/0042032 | A1 | 11/2001 | Crawshaw et al. |
| 2002/0065766 | A1 | 5/2002 | Brown et al. |
| 2002/0073014 | A1 | 6/2002 | Gilbert |
| 2002/0091624 | A1 | 7/2002 | Glodjo et al. |
| 2002/0128949 | A1 | 9/2002 | Wiesehuegel et al. |
| 2002/0135796 | A1 | 9/2002 | Alexander |
| 2002/0147675 | A1 | 10/2002 | Das et al. |
| 2002/0174052 | A1 | 11/2002 | Guler et al. |
| 2003/0018562 | A1 | 1/2003 | Guler et al. |
| 2003/0023540 | A2 | 1/2003 | Johnson et al. |
| 2003/0035429 | A1 | 2/2003 | Mitra et al. |
| 2003/0041007 | A1 | 2/2003 | Grey et al. |
| 2003/0041011 | A1 | 2/2003 | Grey et al. |
| 2003/0041014 | A1 | 2/2003 | Grey et al. |
| 2003/0055729 | A1 | 3/2003 | Bezos et al. |
| 2003/0069828 | A1 | 4/2003 | Blazey et al. |
| 2003/0071861 | A1 | 4/2003 | Phillips |
| 2003/0083926 | A1 | 5/2003 | Semret et al. |
| 2003/0101124 | A1 | 5/2003 | Semret et al. |
| 2003/0167329 | A1 | 9/2003 | Kurakake et al. |
| 2003/0216971 | A1 | 11/2003 | Sick et al. |
| 2004/0010592 | A1 | 1/2004 | Carver et al. |
| 2004/0024687 | A1 | 2/2004 | Delenda |
| 2004/0059646 | A1 | 3/2004 | Harrington et al. |
| 2004/0083160 | A1 | 4/2004 | Byde et al. |
| 2004/0111308 | A1 | 6/2004 | Yakov |
| 2004/0133506 | A1 | 7/2004 | Glodjo et al. |
| 2004/0133609 | A1 | 7/2004 | Moore et al. |
| 2004/0230317 | A1 | 11/2004 | Kumar et al. |
| 2005/0055306 | A1 | 3/2005 | Miller et al. |
| 2005/0071182 | A1 | 3/2005 | Aikens et al. |
| 2005/0138621 | A1 | 6/2005 | Clark et al. |
| 2005/0141554 | A1 | 6/2005 | Hammarlund et al. |
| 2005/0144115 | A1 | 6/2005 | Brett |
| 2005/0149294 | A1 | 7/2005 | Gebhart |
| 2005/0192865 | A1 | 9/2005 | Boutilier et al. |
| 2005/0207340 | A1 | 9/2005 | O'Neill |
| 2005/0256946 | A1 | 11/2005 | Childress et al. |
| 2005/0278240 | A1 | 12/2005 | Delenda |
| 2005/0289042 | A1 | 12/2005 | Friesen |
| 2005/0289043 | A1 | 12/2005 | Maudlin |
| 2006/0047550 | A1 | 3/2006 | Dineen et al. |
| 2006/0069621 | A1 | 3/2006 | Chang et al. |
| 2006/0080210 | A1 | 4/2006 | Mourad et al. |
| 2006/0080224 | A1 | 4/2006 | Schuelke et al. |
| 2006/0080438 | A1 | 4/2006 | Storrie |
| 2006/0149652 | A1 | 7/2006 | Fellenstein et al. |
| 2006/0167703 | A1 | 7/2006 | Yakov |
| 2006/0195386 | A1 | 8/2006 | Glodjo et al. |
| 2007/0087756 | A1 | 4/2007 | Hoffberg |
| 2007/0118419 | A1 | 5/2007 | Maga et al. |
| 2007/0136176 | A1 | 6/2007 | Niedermeier et al. |
| 2007/0276688 | A1 | 11/2007 | Sun et al. |
| 2008/0080552 | A1 | 4/2008 | Gates et al. |

OTHER PUBLICATIONS

U.S. Appl. No. 11/755,980, filed May 31, 2007, Notice of Allowance and Fees Due dated Aug. 6, 2012.
U.S. Appl. No. 11/755,980, filed May 31, 2007, Office Action dated Dec. 20, 2011.
U.S. Appl. No. 11/755,980, filed May 31, 2007, Office Action dated Jun. 23, 2011.
U.S. Appl. No. 11/756,386, filed May 31, 2007, Notice of Allowance and Fees Due dated May 23, 2011.
U.S. Appl. No. 11/756,386, filed May 31, 2007, Notice of Allowance and Fees Due dated Jun. 29, 2010.
U.S. Appl. No. 11/756,386, filed May 31, 2007, Office Action dated Mar. 24, 2010.
U.S. Appl. No. 11/756,386, filed May 31, 2007, Office Action dated Oct. 8, 2009.
Duermeyer, Karin, "Methodology: From Component Business Model to Service Oriented Architecture", IBM Corporation 2004.
Ozsomer et al., "A Resource-Based Model of Market Learning in the Subsidiary: The Capabilities of Exploration and Exploitation", Journal of International Marketing, vol. 11, No. 3, 2003, pp. 1-29.
Mahapatra et al., "Oracel Parallel Processing", Oracle Parallel Execution and Oracle Parallel Server.
The University of Melbourne, Annual Budget 2004.
Nisan, Noam, "Bidding and Allocation in Combinatorial Auctions", Copyright 2000, ACM.
Gaudiano, "Dynamic Resource Allocation for a Sensor Network", Manuscript #335.
Glass, Alyssa, "Creating Socially Conscious Agents: Decision-Making in the Context of Group Commitments", Harvard University, Apr. 1999.
Staudenmayer, Nancy, Interdependency: Conceptual, Empirical, and Practical Issues, Massachusetts Institute of Technology, Jun. 1997.
U.S. Appl. No. 11/755,971, filed May 31, 2007, Office Action dated Jun. 22, 2012.
U.S. Appl. No. 11/755,971, filed May 31, 2007, Office Action dated May 19, 2011.
U.S. Appl. No. 11/755,971, filed May 31, 2007, Office Action dated Nov. 26, 2011.
U.S. Appl. No. 11/756,406, filed May 31, 2007, Notice of Allowance and Fees Due dated Nov. 10, 2011.
U.S. Appl. No. 11/756,406, filed May 31, 2007, Office Action dated Feb. 22, 2011.
U.S. Appl. No. 11/756,406, filed May 31, 2007, Office Action dated Aug. 17, 2010.
U.S. Appl. No. 11/756,313, filed May 31, 2007, Office Action dated Aug. 29, 2011.
U.S. Appl. No. 11/756,313, filed May 31, 2007, Office Action dated Mar. 25, 2011.
U.S. Appl. No. 11/756,313, filed May 31, 2007, Office Action dated Dec. 10, 2010.
U.S. Appl. No. 11/756,313, filed May 31, 2007, Office Action dated Jun. 29, 2010.
U.S. Appl. No. 11/756,416, filed May 31, 2007, Notice of Allowance and Fees Due dated May 17, 2011.
U.S. Appl. No. 11/756,416, filed May 31, 2007, Notice of Allowance and Fees Due dated Jun. 30, 2010.
U.S. Appl. No. 11/756,416, filed May 31, 2007, Office Action dated Mar. 24, 2010.
U.S. Appl. No. 11/756,416, filed May 31, 2007, Office Action dated Oct. 14, 2009.
U.S. Appl. No. 11/756,357, filed May 31, 2007, Office Action dated Nov. 10, 2011.
U.S. Appl. No. 11/756,357, filed May 31, 2007, Office Action dated May 26, 2011.
U.S. Appl. No. 11/756,360, filed May 31, 2007, Notice of Allowance and Fees Due dated May 20, 2011.
U.S. Appl. No. 11/756,360, filed May 31, 2007, Notice of Allowance and Fees Due dated May 19, 2010.
U.S. Appl. No. 11/756,360, filed May 31, 2007, Office Action dated Feb. 8, 2010.
U.S. Appl. No. 11/756,360, filed May 31, 2007, Office Action dated Oct. 14, 2009.
U.S. Appl. No. 11/756,360, filed May 31, 2007, Office Action dated Apr. 24, 2009.
U.S. Appl. No. 11/756,374, filed May 31, 2007, Notice of Allowance and Fees Due dated Dec. 16, 2011.
U.S. Appl. No. 11/756,374, filed May 31, 2007, Office Action dated Aug. 19, 2011.

(56) References Cited

OTHER PUBLICATIONS

U.S. Appl. No. 11/756,374, filed May 31, 2007, Office Action dated Mar. 11, 2011.
U.S. Appl. No. 11/756,374, filed May 31, 2007, Office Action dated Oct. 29, 2010.
U.S. Appl. No. 11/755,985, filed May 31, 2007, Office Action dated Dec. 2, 2011.
U.S. Appl. No. 11/755,985, filed May 31, 2007, Office Action dated May 5, 2011.
U.S. Appl. No. 11/755,985, filed May 31, 2007, Office Action dated Oct. 20, 2010.
U.S. Appl. No. 11/755,985, filed May 31, 2007, Office Action dated Jul. 1, 2010.
U.S. Appl. No. 11/755,985, filed May 31, 2007, Office Action dated Jan. 29, 2010.
U.S. Appl. No. 11/755,985, filed May 31, 2007, Office Action dated Nov. 2, 2009.
U.S. Appl. No. 11/755, 985, filed May 31, 2007, Office Action dated Apr. 1, 2009.
U.S. Appl. No. 11/756,367, filed May 31, 2007, Office Action dated Dec. 9, 2011.
U.S. Appl. No. 11/756,367, filed May 31, 2007, Office Action dated Jun. 13, 2011.
U.S. Appl. No. 11/756,442, filed May 31, 2007, Notice of Allowance and Fees Due dated Sep. 12, 2011.
U.S. Appl. No. 11/756,442, filed May 31, 2007, Office Action dated Jun. 24, 2011.
U.S. Appl. No. 11/756,442, filed May 31, 2007, Office Action dated Feb. 10, 2011.
U.S. Appl. No. 11/756,426, filed May 31, 2007, Notice of Allowance and Fees Due dated Oct. 20, 2010.
U.S. Appl. No. 11/756,442, filed May 31, 2007, Office Action dated Jun. 24, 2010.
U.S. Appl. No. 11/756,442, filed May 31, 2007, Office Action dated Mar. 24, 2010.
U.S. Appl. No. 11/756,442, filed May 31, 2007, Office Action dated Oct. 29, 2009.
U.S. Appl. No. 11/756,325, filed May 31, 2007, Notice of Allowance and Fees Due dated Jul. 14, 2010.
U.S. Appl. No. 11/756,325, filed May 31, 2007, Office Action dated Feb. 2, 2010.
U.S. Appl. No. 11/756,325, filed May 31, 2007, Office Action dated Oct. 13, 2009.
U.S. Appl. No. 11/756,325, filed May 31, 2007, Office Action dated Apr. 27, 2009.
U.S. Appl. No. 11/756,400, filed May 31, 2007, Notice of Allowance and Fees Due dated Oct. 19, 2010.
U.S. Appl. No. 11/756,400, filed May 31, 2007, Office Action dated Jun. 24, 2010.
U.S. Appl. No. 11/756,400, filed May 31, 2007, Office Action dated Mar. 24, 2010.
U.S. Appl. No. 11/756,400, filed May 31, 2007, Office Action dated Oct. 8, 2009.
Lan, U.S. Appl. No. 11/755,971, Office Action, May 14, 2013, 16 pages.
LAN, U.S. Appl. No. 11/755,971, Notice of Allowance & Fees Due, Jul. 8, 2013, 12 pages.

INTELLIGENT BUYER'S AGENT USAGE FOR ALLOCATION OF SERVICE LEVEL CHARACTERISTICS

CROSS-REFERENCE TO RELATED APPLICATIONS

This application is a continuation of U.S. patent application Ser. No. 11/755,980, May 31, 2007 which is now U.S. Pat. No. 8,332,859 and is herein incorporated by reference in its entirety.

FIELD

The present invention generally relates to processing bids in a resource management framework. Specifically, the present invention relates to a system and method of utilizing a buyer's agent to manage the process of bidding on resources in a resource management framework.

BACKGROUND

Businesses are experiencing an ever-increasing trend to achieve higher utilization of computing resources. Companies that provide their own information technology (IT) computing services are being driven to find ways to decrease costs by increasing utilization. Moreover, companies that provide these services are being driven to reduce overhead and become more competitive by increasing utilization of these resources. Numerous studies over the past decade have shown that typical utilization levels of computing resources within service delivery centers, raised floors, and data centers fall between 20% and 80%. This leaves a tremendous amount of white space with which to improve utilization and drive costs down.

One way to capitalize on the under-utilization of such resources is to provide a resource management framework in which different clients or business units are allowed to compete for common resources. Such competition can occur both on an inter-organization level as well as on an intra-organization level (e.g., between business units). However, none of the existing approaches addresses how to effectively deal with the fallout of different entities bidding or vying for the same resource. That is, none of the existing approaches provides an infrastructure in which a business unit can most effectively use its bidding assets (e.g., chips) when competing for computational resources.

For instance, a business unit may overbid for a resource that is not in high demand or get into a bidding war with another business unit for a resource that is in high demand. In addition, there is no way for the entity to predict the likelihood that it could lose a resource and should up its bid. The result is the inefficient use of bidding assets, which leads to the potential for not being able to provide a service level required by the business unit. Accordingly, there exists a need in the art to overcome the deficiencies and limitations described hereinabove.

SUMMARY OF THE INVENTION

Aspects of this application describe a system and method that utilizes a buyer's agent to effectively manage the bidding process for obtaining resources for a business unit (e.g., client). Features include the ability to manage the unused bidding assets (i.e., chips) for a client, the ability to automatically force a new bid or placement of more chips on a current resource based on the likelihood that a service level may fail, the ability to use historical analysis as well as capacity information to determine how and when to best re-distribute chips to minimize the likelihood that a required service level may fail, while at the same time reducing the number of chips or rate of chip depletion to maximize 'value for money' for the client, and the ability to perform cooperative negotiation with other buyer's agents to ensure that two or more parties can collaborate when participating in an auction.

One aspect of the present invention provides a system positioned between a client and a resource broker for managing bids within a resource management framework, comprising: a system for submitting a bid to the resource broker to acquire a set of resources for the client; a monitoring system for ensuring a required service level of the client is being met; and a system for automatically resubmitting a bid to the resource broker if the required service level is not met.

Another aspect of the present invention provides a program product stored on a computer readable medium for managing bids for a client within a resource management framework, the computer readable medium comprising program code for causing a computer system to: submit a bid to a resource broker to acquire a set of resources for the client; monitor activity to ensure a required service level of the client is being met; and automatically resubmit a bid to the resource broker if the required service level is not met.

Another aspect of the present invention provides a method for managing the bidding of chips for resources in a resource management framework, comprising: providing an agent between a client and a resource broker; communicating a required service level from the client to the agent; using historical data to determine a set of resources capable of fulfilling the required service level; using historical data to determine a likely amount of chips needed to obtain the set of resources; automatically submitting a bid from the agent to the resource broker to obtain the set of resources; once obtained, monitoring the set of resources to ensure that the required services levels are being met; and automatically submitting a re-bid from the agent to the resource broker if the required service levels are not being met.

Another aspect of the present invention provides computer software embodied in a propagated signal for managing bids for a client within a resource management framework, the computer software comprising instructions for causing a computer system to: submit a bid to a resource broker to acquire a set of resources for the client; monitor activity to ensure a required service level of the client is being met; and automatically resubmit a bid to the resource broker if the required service level is not met.

Another aspect of the present invention provides a method for deploying a system for managing bids for a client within a resource management framework: providing a computer infrastructure being operable to: submit a bid to a resource broker to acquire a set of resources for the client; monitor activity to ensure a required service level of the client is being met; and automatically resubmit a bid to the resource broker if the required service level is not met.

Another aspect of the present invention provides a data processing system for managing bids for a client within a resource management framework, comprising: a processing unit, a bus coupled to the processing unit, a memory medium coupled to the bus, the bus comprising instructions, which when executed by the processing unit cause the data processing system to: submit a bid to a resource broker to acquire a set of resources for the client; monitor activity to ensure a required service level of the client is being met; and automatically resubmit a bid to the resource broker if the required service level is not met.

Another aspect of the present invention provides at least one computer system positioned between a first business unit and a resource broker for managing bids within a resource management framework, the at least one computer system including: a bid management system configured to: use historical data to determine an amount of a set of resources capable of fulfilling a required service level for the first business unit, wherein the first business unit is one of a plurality of business units within the resource management framework, wherein the plurality of business units compete for the set of resources via a dynamic auction, wherein each of the set of resources includes distinct levels of service, wherein the required service level is a service level necessary to perform a function of the first business unit; use historical data to determine a likely amount of chips needed to obtain the amount of the set of resources; submit a first bid to the resource broker to acquire the amount of the set of resources; monitor activity to ensure the required service level is met based upon the acquired set of resources; automatically force a bidding process for the set of resources between the first business unit and another business unit in the plurality of business units based upon a likelihood that the required service level will not be met by the acquired set of resources; and automatically submit a second bid to the resource broker when the required service level is not met, based upon the acquired set of resources after the first bid, wherein the second bid includes a distinct bid amount from the first bid.

Another aspect of the present invention provides a program product stored on a non-transitory computer readable storage medium for managing bids for a first business unit within a resource management framework, the computer readable medium comprising program code for causing a computer system to: use historical data to determine an amount of a set of resources capable of fulfilling a required service level for the first business unit, wherein the first business unit is one of a plurality of business units within the resource management framework, wherein the plurality of business units compete for the set of resources via a dynamic auction, wherein each of the set of resources includes distinct levels of service, wherein the required service level is a service level necessary to perform a function of the business unit; use historical data to determine a likely amount of chips needed to obtain the amount of the set of resources; submit a first bid to the resource broker to acquire the amount of the set of resources; monitor activity to ensure the required service level is met based upon the acquired set of resources; automatically force a bidding process for the set of resources between the first business unit and another business unit in the plurality of business units based upon a likelihood that the required service level will not be met by the acquired set of resources; and automatically submit a second bid to the resource broker when the required service level is not met, based upon the acquired set of resources after the first bid, wherein the second bid includes a distinct bid amount from the first bid.

Another aspect of the present invention provides a method for deploying a system for managing bids for a first business unit within a resource management framework, the method including: providing a computer infrastructure to: use historical data to determine an amount of a set of resources capable of fulfilling a required service level for the first business unit, wherein the first business unit is one of a plurality of business units within the resource management framework, wherein the plurality of business units compete for the set of resources via a dynamic auction, wherein each of the set of resources includes distinct levels of service, wherein the required service level is a service level necessary to perform a function of the business unit; use historical data to determine a likely amount of chips needed to obtain the amount of the set of resources; submit a first bid to the resource broker to acquire the amount of the set of resources; monitor activity to ensure the required service level is met based upon the acquired set of resources; automatically force a bidding process for the set of resources between the first business unit and another business unit in the plurality of business units based upon a likelihood that the required service level will not be met by the acquired set of resources; and automatically submit a second bid to the resource broker when the required service level is not met, based upon the acquired set of resources after the first bid, wherein the second bid includes a distinct bid amount from the first bid.

BRIEF DESCRIPTION OF THE DRAWINGS

These and other features of this invention will be more readily understood from the following detailed description of the various aspects of the invention taken in conjunction with the accompanying drawings in which.

Figure 1:
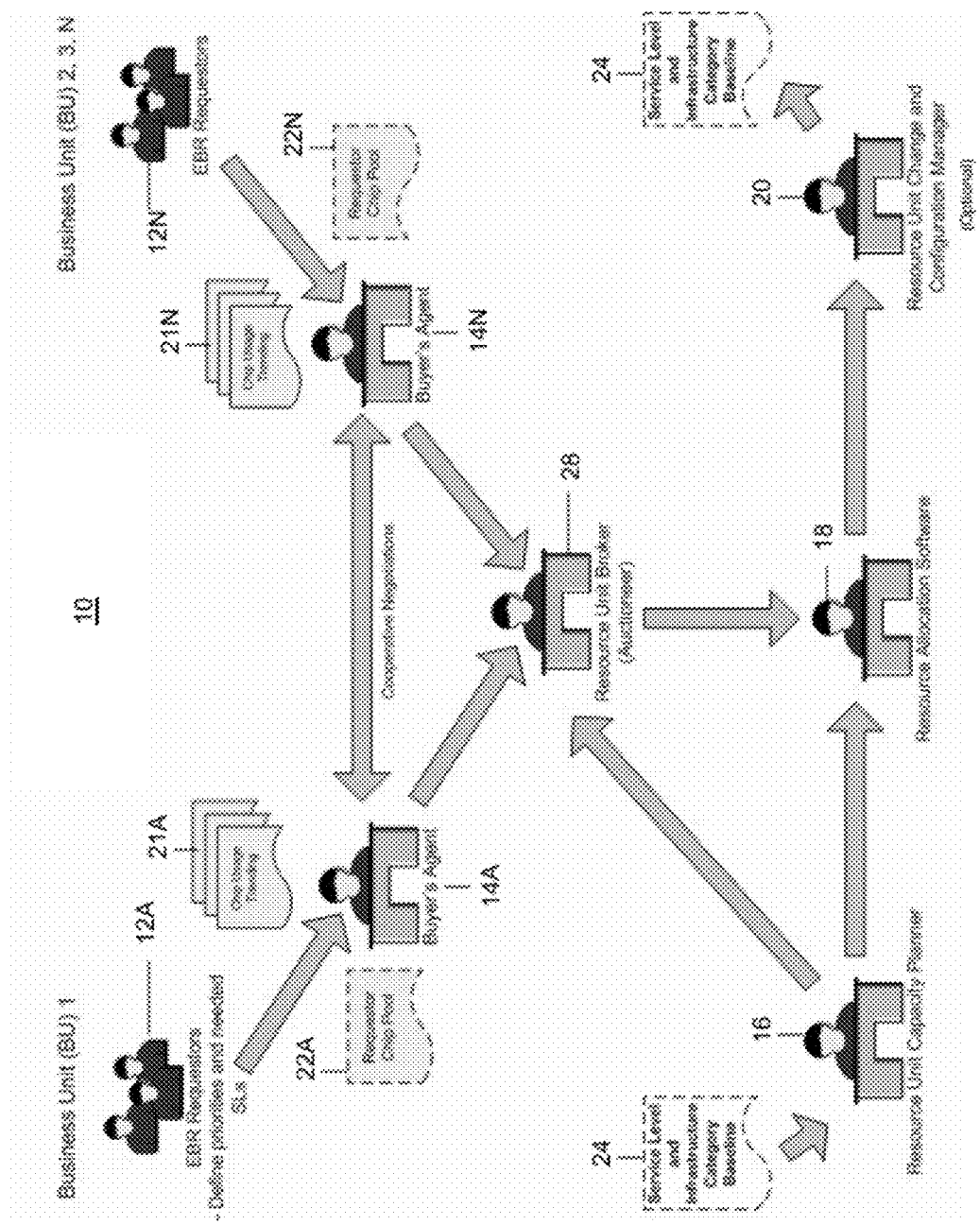
FIG. 1 shows an illustrative resource management framework according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

For convenience, the Detailed Description of the Invention has the following sections:

I. General Description
II. Bid Management
III. Computerized Implementation

I. General Description

As used herein, the following terms have the following definitions:

"Chip" means any unit (virtual or otherwise) that may be exchanged for resources such as information technology (IT) resources, i.e., a bidding asset.

"Party" means any individual, group of individuals, department, business unit, cell of a component business model, etc.

"Discrete Event" means a scheduled event such as an auction.

"Fluid Event" means any non-scheduled event such as a random purchase.

"Service Level Characteristic" means any type of computer or IT requirement needed by the business, including any non-functional requirements that specify criteria that can be used to judge the operation of a system, rather than specific behaviors.

"Elemental Bidding Resource (EBR)" means any computational resource (e.g., memory, processing cycles, etc.) sought by a party to accomplish objectives.

As indicated above, this application describes (among other things) an application of resource unit brokering algorithms, chip management methods for automated brokering, chip management methods for live brokering, and chip allocation methods to the brokering of operational support characteristics of service level management within an enterprise. Typically, the operational support characteristics are derived from known capacity values that are provided by configuration managers. Calculations are made on the capacity values and maximum quantities of the availability resource units are provided to resource brokers for spot or periodic sale and/or auction to one or more buyers' agents. Among other things, this application describes the offering of operational support service level characteristics for sale or auction in a Service Level and IT Resource Optimization framework.

Each service level category within a service level management framework can be decomposed into numerous component building blocks that tie into the sundry infrastructure categories within the IT infrastructure. These infrastructure categories include the storage subsystems, storage networks, servers or hosts, local area networks, operating systems and applications. It is understood that there can be other infrastructure categories depending upon how the infrastructure components of IT are decomposed.

The existence of certain components or quantities of components in each infrastructure category will predicate the ability to provide a particular service or provide differing service levels of the service. These components can be expressed typically in terms of capacities, assets, personnel and configurations. It is these constituent capacities, assets, personnel and configurations that are grouped and offered to aid in the support of a particular service level. It is not necessarily the intention of this application to discuss the groups that comprise a particular service level. The constituent capacities, assets, personnel and configurations each have unique enablers that allow them to fit into the overall Service Level and IT Resource Optimization framework. This application describes (among other things) the methods and process to take a suggested grouping of constituent capacities, assets, personnel and configurations as they relate to a operational support service category and enable them to be sold, bartered and/or auctioned in the Service Level and IT Resource Optimization framework.

Referring now to FIG. 1, a resource management framework (hereinafter framework 10) is depicted as described in U.S. patent application Ser. No. 11/755,980, which is now U.S. Pat. No. 8,332,859, which was cross-referenced and incorporated above. This framework is typically leveraged under the present invention, and hence, is being shown and described in conjunction with FIG. 1. As shown, framework 10 is generally comprised of business units 12A, 12N, buyer's agents 14A, 14N, resource unit capacity planner 16, resource allocation software 18, resource unit change and configuration manager 20, and resource unit broker 28. These components typically leverage additional assets such as chip usage trending 21A, 21N, requestor chip pool 22A, 22N, and service level and infrastructure category baseline 24.

An objective of framework 10 is to reach a means of maximizing utilization of IT Resources among competing consumers such as business units 12A-B by distribution of the decision making/allocation process according to relative needs of applications. Doing so eliminates the need for traditional service level agreements (SLAs), and allows each business unit 12A-N to make dynamic "free market" decisions as to how best to obtain the service levels required from a highly-commoditized IT service provider.

To this end, business units 12A, 12N relay their priorities and computing needs to the buyer's agents 14A, 14N. Buyer's agents 14A, 14N then determine whether to engage in cooperative or competitive negotiations and implement a request for an EBR on the business unit's 12A, 12N behalf. Various methods can be employed by the resource unit broker 28 to fulfill requests for resources to consumers or business units 12A, 12N. Methods include the use of non-depleting chips, the use of discrete chips, the use of fluid chips, etc. Regardless, the buyers' agents 14A, 14N understand the thresholds business units 12A, 12N are willing to pay, their associated targets for various service level characteristics, and will programmatically employ the most advantageous bidding strategy.

The resource unit capacity planner 16 reports to resource unit brokers 28 (e.g., auctioneers) what resources are available (e.g., infrastructure components) at any given time. Resource allocation software 18 includes products such as Enterprise Workload Manager (EWLM)™, WebSphere® XD, and Partition Load Manager™. The goal-oriented policies within these products are updated by inputs from the resource unit broker 28 and/or resource unit broker capacity 16. Change management may be all self-contained in resource allocation software 18, or there may be cases where additional change control needs to be performed. This functionality is provided herein by resource unit change and configuration manager 20.

As indicated above, the present invention involves the ability to effectively manage the bidding process to achieve an efficient use of bidding assets, i.e., chips. In general, bidding is done using chips allocated to parties such as business units 12A, 12N. That is, business units 12A, 12N will be allocated a certain quantity of chips pursuant to a business transaction (e.g., a financial transaction). Those chips can then be used for bidding in an attempt to be allocated computational resources.

Consider, for the sake of simplicity, the case where only two business units 12A, 12N are competing for IT resources. This business units 12A-N will be known simply as BU1 and BU2, and each is represented by its own respective agent 14A, 14N. In the discrete chip model, periodic auctions are held, and winners are determined for the duration of the allocation cycle, such that resources are distributed accordingly. Specifically, agents 14A, 14N will submit bids on behalf of business units 12A, 14N. Each bid is for an amount (e.g., one or more) of chips that were allocated to business units 12A, 12N. It should be noted that each business unit 12A, 12N is not necessarily allocated the same amount of chips. For example, business unit "A" may be able to purchase more chips than business unit "B". In any event, resource unit broker 28 will act as an auctioneer and determine a winner. As part of its role, resource unit broker 28 will communicate with resource unit capacity planner 16 and resource allocation software 18 as outlined herein.

II. Bid Management

Figure 2:
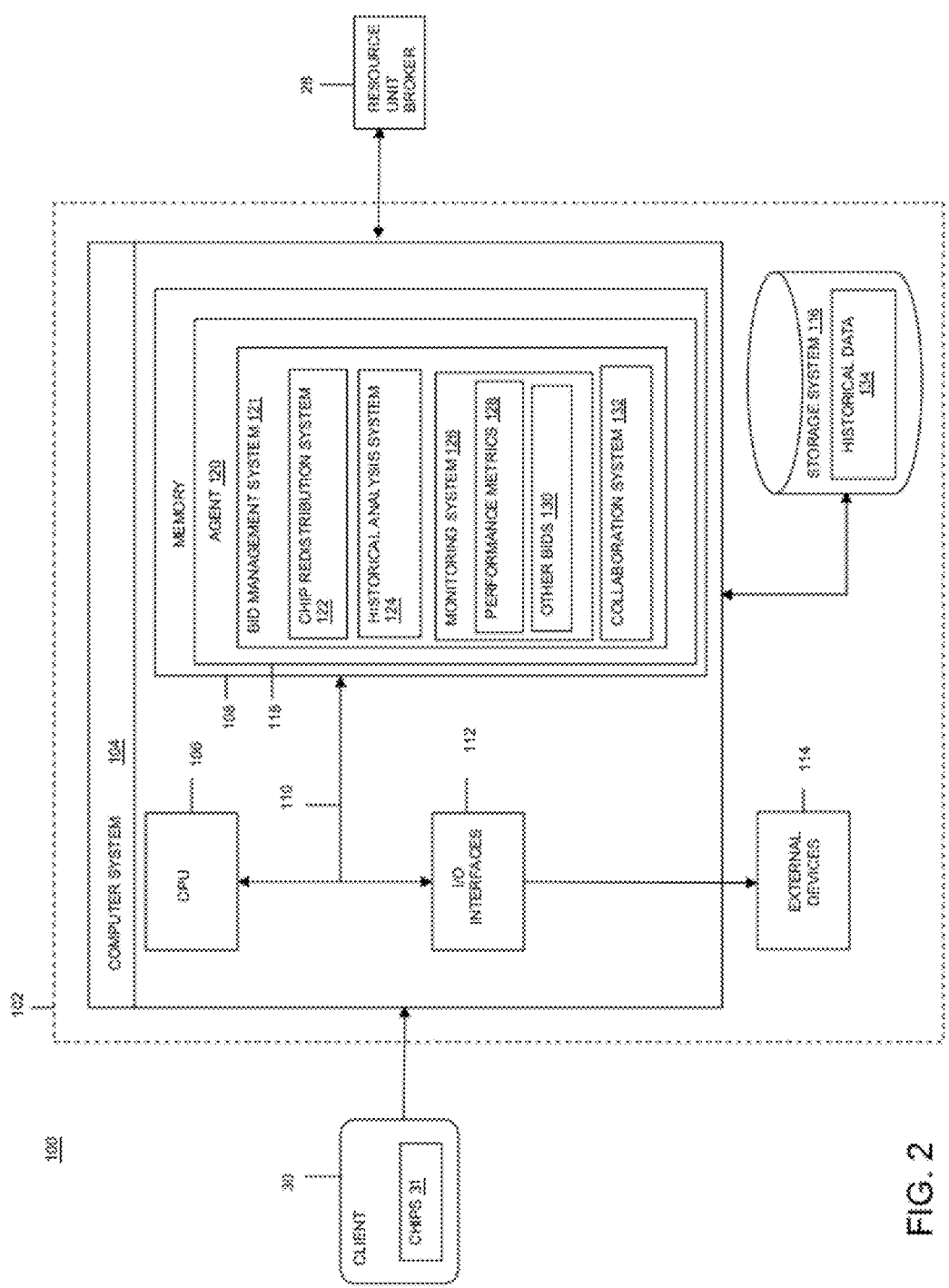
FIG. 2 depicts a computerized implementation of the present invention.

Referring now to FIG. 2, a computer system 104 for implementing a buyer's agent 120 that is positioned between a client 30 and a resource unit broker 28 is shown. The client 30 is the customer of resources provided by the resource unit broker 28. The client 30 is given a number of chips 31 that can be used to bid on resources. The client 30 can use these chips 31 to bid on each resource such that the resource will be available to run the client's applications. The client 30 does not interact directly with the resource unit broker 28. Instead, the client 30 interacts with the buyer's agent 120. The client 30 determines a level of service required, e.g., x transactions/second, y CPU hours, etc., and communicates this information to the buyer's agent 120.

The buyer's agent 120 receives this input from the client 30 as a guide to managing the client's chips 31. The buyer's agent 120 uses this information to determine how to interact with the resource unit broker 28 to request a new resource, start a new bid process or to modify the current chip distribution in order to meet the service level requirements. The buyer's agent 120 monitors how well each of the 'won' resources is being used and to ensure that the service levels dictated by the client 30 are being met. It also stores this historical data 134 in a storage system 116 for trending analysis purposes.

The resource unit broker 28 takes instructions from the buyer's agent 120 to perform the necessary chip redistribution or engage in a new bidding process. The resource unit broker 28 provides metrics as to how the resources are performing and details regarding whether any other clients have outbid or otherwise reduced the amount of resources available to the client 30.

Buyer's agent 120 includes a bid management system 121 for managing bids submitted to resource unit broker 28. More specifically, bid management system 121 provides a system and method to determine how chips 31 are brokered (i.e., where to place chips 31 and how to change distributions of chips 31), based on service level characteristics (SLCs).

Bid management system 121 provides an efficient and automated mechanism for mapping client SLCs to a distribution of chips 31 for bidding on information technology resources. For example, client 30 may need to have a throughput service level of x transactions/minute and therefore needs to have enough resources to provide this level of service. The resource management framework provides a mechanism for multiple clients to bid on resources to gain a level of service. Because the level of resources allocated to an individual client may change (for example, if a resource is suddenly lost due to another client bidding more chips in a 'winner takes all scenario'), bid management system 121 is utilized to identify the loss of the resource and decide whether an automatic re-bid should take place to restore service as quickly as possible, e.g., so that the x transactions/minute can be retained. Bid management system 121 utilizes historical trending as well as capacity information to automate this process such that the client can minimize the chance of failing a service level agreement (SLA) because of being outbid by another client on vital resources.

Features provided by bid management system 121 include the ability to: (1) manage any 'unused' chips 31 for client 30; (2) automatically force a new bid or placement of more chips 31 on a current resource based on the likelihood that a service level may fail; (3) use historical analysis as well as capacity information to determine how and when to best redistribute the chips 31 to minimize the likelihood that an SLA may fail, while at the same time reducing the number of chips 31 or rate of chip depletion to maximize 'value for money' for the client 30; and (4) to perform cooperative negotiation with other buyer's agents to ensure that two or more parties can collaborate when participating in an auction.

As shown in this illustrative embodiment, bid management system 121 includes a chip redistribution system 122, a historical analysis system 124, a monitoring system 126 and a collaboration system 132. Chip redistribution system 122 is utilized to automatically place a new bid, increase the number of chips 31 already bid on a resource, or decrease the number of chips 31 already bid on a resource.

Historical analysis system 124 utilizes historical data 134 to perform historical analysis and trending of capacity/throughput usage to understand the minimum level of resources required to meet a specific service level as well as the likely number of chips 31 required to win a resource.

Monitoring system 126 continuously monitors performance metrics 128 regarding how well the resources won by client 30 are performing to ensure that the required service levels are being met. It also monitors other bids 130 to make sure that the client 30 is not being outbid for a given resource.

Collaboration system 132 allows two or more clients to collaborate when bidding for resources, rather than competing against each other in a bidding war. Consider the example of two clients, A and B bidding on a resource to perform billing. Both A and B need a resource for one hour to complete their billing requirements. Client A bids 100 chips, B bids 200 chips, A then re-bids 400 chips, etc. In this scenario, both A and B end up bidding more chips than they needed to win the resource. This is a usual characteristic of an auction—driving up the bidding. The resource management framework, however, is different than a usual auction in that clients should be able to collaborate when bidding on resources.

Collaboration system 132 allows for any type of collaboration, e.g., it allows A and B to pool their chips together, it allows for sharing a resource, etc. For example, assume that the resource being bid is available for two hours; A could use the resource for one hour, followed by B for one hour. In this scenario, A and B could pool their chips and collectively bid 100 chips for two hours use of the resource. In another embodiment, when the resource is won, it can be time sliced and shared by both. Collaborative system 132 allows for collaboration by one or more buyer's agents 120 at the time of the bidding process.

In one illustrative embodiment, to implement cooperative negotiation, when a client 30 determines that it will take part in a bidding session, the buyer's agent 120 communicates to each of the other buyer's agents that have a common agreement for collaboration with the details of the request. For example, client A's intelligent agent may send a request stating "I'm bidding on a resource type X for one hour of work". Any other buyer's agents that are also bidding and have similar requirements may reply and state that they are bidding on a similar resource. The negotiation then decides whether the two buyer's agents should collaborate or not. This collaboration may be manual in nature, e.g., between two client managers, or may be automated according to a preset number of rules.

The following is an illustrative example involving bid management system 121.

(1) Assume that the client 30 has 100 non-depleting chips 31 that can be placed on resources.

(2) The client 30 first determines the service levels required from each biddable resource—for example, 100 transactions per second are required.

(3) The buyer's agent 120 determines a set (i.e., one or more) of resources that can fulfill the service levels and communicates with the resource unit broker 28 to start a new bid to attempt to win the set of resources.

(4) The resource unit broker 28 performs the bidding and win strategies based on input from the buyer's agent 120 to win resources for the client 30. Assume that the bidding results in three resources being allocated to the client 30—each resource taking 30 chips to win. The buyer's agent therefore has 90 chips distributed over three resources, with 10 'free' chips left.

(5) The resource unit broker 28 constantly feeds information back to the buyer's agent 120 as to how well the three resources are performing. Assume that each of the resources is performing at 40 transactions per second—a total of 120 transactions per second.

(6) The monitoring system 128 constantly monitors the performance of the resources and determines that the threshold of 100 transactions per second is being met.

(7) Assume that another client starts a bid and wins one of the three resources by bidding 31 chips for a resource in a 'winner takes all' winning bid strategy. This resource is now not available for service.

(8) The resource unit broker 28 now feeds this information to the buyer's agent 120 to say that only two resources are now available, providing only 80 transactions per second combined.

(9) The bid management system 121 now determines that the service level is not being met, so a new distribution is required.

(10) The chip redistribution system 122 initiates a re-bid and bids 32 chips for the resource.

(11) The resource unit broker 28 grants the resource back to the client 30 and the number of transactions per second jumps back to 120 transactions per second.

The above example shows a simple scenario. Bid management system 121 also includes the ability for the buyer's agent 120 to 'learn' how the resources perform, and more importantly, how many chips are needed to win resources. For example, if bid management system 121 learns that only 10 chips are needed to win a resource at 3:00 AM rather than 9:00 AM, bid management system 121 may hold off a re-bid until a later time such that the resource can be won with the least amount of chips 31. The bid management system 121 may also learn that a different resource would be able to meet service levels with a smaller number of chips 31, thus chip redistribution system 122 may move the 30 chips away from one resource to other resources (possible freeing up chips in the process).

This constant automated self optimization loop ensures that:

(1) Service levels are being met;
(2) A minimum number of chips 31 (or depletion of chips) can be used to ensure the level of service; and
(3) The client 30 does not have to manually keep re-bidding resources in the event that the number of resources associated with the client 30 changes.

III. Computerized Implementation

As depicted, resource management framework 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets—based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, computer system 104 includes a processing unit 106, a memory 108, a bus 110, and input/output (I/O) interfaces 112. Further, computer system 104 is shown in communication with external I/O devices/resources 114 and storage system 116. In general, processing unit 106 executes computer program code, such as operational support program 118, which is stored in memory 108 and/or storage system 116. While executing computer program code, processing unit 106 can read and/or write data to/from memory 108, storage system 116, and/or I/O interfaces 112. Bus 110 provides a communication link between each of the components in computer system 104. External devices 114 can comprise any devices (e.g., keyboard, pointing device, display, etc.) that enable a user to interact with computer system 104 and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the process(es) of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, I/O interfaces 112 can comprise any system for exchanging information with one or more external device 114. Still further, it is understood that one or more additional components (e.g., system software, math co-processing unit, etc.) not shown in FIG. 2 can be included in computer system 104. However, if computer system 104 comprises a handheld device or the like, it is understood that one or more external devices 114 (e.g., a display) and/or storage system 116 could be contained within computer system 104, not externally as shown.

Storage system 116 can be any type of system (e.g., a database) capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104. It should be understood computer system 104 could be any combination of human, hardware and/or software. It is shown as such to illustrate the functions as described herein. To this extent, the functions of computer system 104 could be provided by any of the components of FIG. 1 (e.g., agents 14A-N, resource unit broker 28, etc.).

Shown in memory 108 of computer system 104 is buyer's agent 120, which facilitates the functions as described herein. It should be understood resource unit broker 28 can provide any of the functions described in the above-incorporated applications. As depicted, buyer's agent 120 includes a bid management system 121 having a chip redistribution system 122, a historical analysis system 124, a monitoring system 126, and a collaboration system 132. It should be understood that this configuration of functionality is intended to be illustrative only, and that identical or similar functionality could be provided with a different configuration of systems.

While shown and described herein as a method and system for implementing a bid management system 121, it is understood that the invention further provides various alternative embodiments. For example, in one embodiment, the invention provides a computer-readable/useable medium that includes computer program code to enable a computer infrastructure to provide a bid management system 121. To this extent, the computer-readable/useable medium includes program code that implements the process(es) of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 and/or storage system 116 (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide a bid management system 121. In this case, the service provider can create, maintain, support, etc., a computer infrastructure, such as computer infrastructure 102 that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for providing bid management services. In this case, a computer infrastructure, such as computer infrastructure 102, can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 104, from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. At least one computer positioned between a first business unit and a resource broker for managing bids within a resource management framework, the at least one computer system comprising:
    a bid management system configured to:
        use historical data to determine an amount of a set of resources capable of
        fulfilling a required service level for the first business unit,
        wherein the first business unit is one of a plurality of business units within the resource management framework,
        wherein the plurality of business units compete for the set of resources via a dynamic auction,
        wherein each of the set of resources includes distinct levels of service,
        wherein the required service level is a service level necessary to perform a function of the first business unit;
        use historical data to determine a likely amount of chips needed to obtain the amount of the set of resources;
        submit a first bid to the resource broker to acquire the amount of the set of resources;
        monitor activity to ensure the required service level is met based upon the acquired set of resources;
        automatically force a bidding process for the set of resources between the first business unit and another business unit in the plurality of business units based upon a likelihood that the required service level will not be met by the acquired set of resources; and
        automatically submit a second bid to the resource broker when the required service level is not met, based upon the acquired set of resources after the first bid,
        wherein the second bid includes a distinct bid amount from the first bid.

2. The at least one computer of claim 1, wherein the bid management system monitors performance metrics associated with the set of resources.

3. The at least one computer of claim 1, wherein the bid management system determines whether a resource among the acquired set of resources is lost to a higher bidder in the plurality of business units.

4. The at least one computer of claim 1, wherein the bid management system further allows a plurality of agents representing the plurality of business units to collaborate on a bidding process for the set of resources.

5. The at least one computer of claim 1, wherein the bid management system further determines a best time to acquire a resource among the set of resources with a minimum bid value.

6. A program product stored on a non-transitory computer readable storage medium for managing bids for a first business unit within a resource management framework, the non-transitory computer readable storage medium comprising program code for causing a computer system to:
- use historical data to determine an amount of a set of resources capable of fulfilling a required service level for the first business unit,
  - wherein the first business unit is one of a plurality of business units within the resource management framework,
  - wherein the plurality of business units compete for the set of resources via a dynamic auction,
  - wherein each of the set of resources includes distinct levels of service,
  - wherein the required service level is a service level necessary to perform a function of the business unit;
- use historical data to determine a likely amount of chips needed to obtain the amount of the set of resources;
- submit a first bid to the resource broker to acquire the amount of the set of resources;
- monitor activity to ensure the required service level is met based upon the acquired set of resources;
- automatically force a bidding process for the set of resources between the first business unit and another business unit in the plurality of business units based upon a likelihood that the required service level will not be met by the acquired set of resources; and
- automatically submit a second bid to the resource broker when the required service level is not met, based upon the acquired set of resources after the first bid, wherein the second bid includes a distinct bid amount from the first bid.

7. The program product of claim 6, wherein the monitoring of the activity includes monitoring performance metrics associated with the set of resources.

8. The program product of claim 6, wherein the monitoring of the activity includes determining whether a resource among the acquired set of resources is lost to a higher bidder in the plurality of business units.

9. The program product of claim 6, further comprising program code for causing the computer system to allow a plurality of agents representing the plurality of business units to collaborate on a bidding process for the set of resources.

10. The program product of claim 6, further comprising program code for causing the computer system to determine a best time to acquire a resource among the set of resources with a minimum bid value.

* * * * *